United States Patent [19]

Agrawal et al.

[11] Patent Number: 6,003,029
[45] Date of Patent: Dec. 14, 1999

[54] AUTOMATIC SUBSPACE CLUSTERING OF HIGH DIMENSIONAL DATA FOR DATA MINING APPLICATIONS

[75] Inventors: Rakesh Agrawal, San Jose, Calif.; Johannes Ernst Gehrke, Madison, Wis.; Dimitrios Gunopulos, San Jose; Prabhakar Raghavan, Saratoga, both of Calif.

[73] Assignee: International Business Machines Corporation, Armonk, N.Y.

[21] Appl. No.: 08/916,347

[22] Filed: Aug. 22, 1997

[51] Int. Cl.$^6$ ..................................................... G06F 17/30
[52] U.S. Cl. ........................................ 707/7; 707/1; 707/6
[58] Field of Search ........................................ 707/7, 1, 6

[56] References Cited

U.S. PATENT DOCUMENTS

| | | | |
|---|---|---|---|
| 4,956,774 | 9/1990 | Shibamiya et al. | 364/200 |
| 5,031,206 | 7/1991 | Riskin | 379/97 |
| 5,168,565 | 12/1992 | Morita | 395/600 |
| 5,418,951 | 5/1995 | Damashek | 395/600 |
| 5,446,908 | 8/1995 | Kevorkian | 395/800 |
| 5,655,137 | 8/1997 | Kevorkian | 395/800.17 |
| 5,669,006 | 9/1997 | Joskowicz et al. | 395/779 |
| 5,742,283 | 4/1998 | Kim | 345/302 |
| 5,784,540 | 7/1998 | Faltings | 395/51 |

OTHER PUBLICATIONS

R. Agrawal et al., Automatic Subspace Clustering of High Dimensional Data for Data Mining Applications, Paper AR_297, pp. 1–18, 1997.

R. Agrawal et al., Modeling Multidemsional Databases, Procedings of the 13th International Conference on Data Engineering, pp. 232–234, Birmingham, England, Apr., 1997.

P.J. Rousseeuw et al., Robust Regression and Outlier Detection, John Wiley & Sons, pp. 216–229, 1987.

A. Arning et al., A Linear Method for Deviation Detection in Large Databases, Proceedings of the 2nd International Conference on Knowledge Discovery in Databases and Data Mining, pp. 164–169, Portland, Oregon, Aug., 1996.

C.J. Matheus et al., Selecting and Reporting What is Interesting, Advances in Knowledge Discovery and Data Mining, pp. 495–515, AAAI Press, 1996.

W. Klosgen, Efficient Discovery of Interesting Statements in Databases, Journal of Intelligent Information Systems (JIIS), vol. 4, No. 1, pp. 53–69, Jan. 1995.

D.C. Montgomery, Design and Anaylsis of Experiments, Third Edition, John Wiley & Sons, pp. 196–215, and pp. 438–455, 1991.

S. Agarwal et al., On the Computation of Multidimensional Aggregates, Proceedings of the 22nd VLDB Conference Mumbai (Bombay), India, 1996, pp. 1–16.

R. Agrawal et al., An Interval Classifier for Database Mining Applications, Proceedings of the 18th VLDB Conference, Vancouver, British Columbia, Canada, 1992, pp. 1–14.

R. Agrawal et al. Database Mining: A Performance Perspective, IEEE Transactions on Knowledge and Data Engineering, vol. 5, No. 6, Dec. 1993, pp. 914–925.

L.G. Valiant, A Theory of the Learnable, Communications of the ACM, vol. 27, pp. 1134–1142, 1984.

(List continued on next page.)

Primary Examiner—Thomas G. Black
Assistant Examiner—Frantz Coby
Attorney, Agent, or Firm—Khanh Q. Tran, Esq.; Banner & Witcoff, Ltd.

[57] ABSTRACT

A method for finding clusters of units in high-dimensional data having the steps of determining dense units in selected subspaces within a data space of the high-dimensional data, determining each cluster of dense units that are connected to other dense units in the selected subspaces within the data space, determining maximal regions covering each cluster of connected dense units, determining a minimal cover for each cluster of connected dense units, and identifying the minimal cover for each cluster of connected dense units.

32 Claims, 8 Drawing Sheets

OTHER PUBLICATIONS

D.E. Rumelhart et al., Feature Discovery by Competitive Learning, originally published in Cognitive Science, 9:1, 1965, pp. 306–325.

R.S. Michalski et al. Learning from Observation: Conceptual Clustering, Machine Learning: An Artificial Approach, vol. I, R.S. Michalski et al. (Editors), Morgan–Kaufman, pp. 331–363, 1983.

S. Jose, Conceptual Clustering, Categorization, and Polymorphy; Machine Learning 3: 343–372; Copyright 1989 Kluwer Academic Publishers.

D.H. Fisher, Knowledge Acquisition Via Incremental Conceptual Clustering; pp. 267–283; Originally published in Machine Learning, copyright 1987 Kluwer Academic Publishers, Boston.

D.W. Aha et al., Instance–Based Learning Algorithms; Machine Learning, 6, 37–66 copyright 1991 Kluwer Academic Publishers, Boston.

AUTOMATIC SUBSPACE CLUSTERING OF HIGH DIMENSIONAL DATA FOR DATA MINING APPLICATIONS

CROSS-REFERENCE TO RELATED APPLICATIONS

The present application is related to an application entitled "Discovery-Driven Exploration Of OLAP Data Cubes," by Sunita Sarawagi and Rakesh Agrawal, Ser. No. 08/916,346 filed on Aug. 22, 1997, having common ownership, filed concurrently with the present application, and incorporated by reference herein.

BACKGROUND OF THE INVENTION

1. Field of the Invention

The present invention relates to the field of computing. More particularly, the present invention relates to an approach for organizing data within a dataset for data mining.

2. Description of the Related Art

Clustering is a descriptive task associated with data mining that identifies homogeneous groups of objects in a dataset. Clustering techniques have been studied extensively in statistics, pattern recognition, and machine learning. Examples of clustering applications include customer segmentation for database marketing, identification of subcategories of spectra from the database of infra-red sky measurements, and identification of areas of similar land use in an earth observation database.

Clustering techniques can be broadly classified into partitional techniques and hierarchial techniques. Partitional clustering partitions a set of objects into K clusters such that the objects in each cluster are more similar to each other than to objects in different clusters. For partitional clustering, the value of K can be specified by a user, and a clustering criterion must be adopted, such as a mean square error criterion, like that disclosed by P. H. Sneath et al., Numerical Taxonomy, Freeman, 1973. Popular K-means methods, such as the FastClust in SAS Manual, 1995, from the SAS Institute, iteratively determine K representatives that minimize the clustering criterion and assign each object to a cluster having its representative closest to the cluster. Enhancements to partitional clustering approach for working on large databases have been developed, such as CLARANS, as disclosed by R. T. Ng et al., Efficient and effective clustering methods for spatial data mining, Proc. of the VLDB Conference, Santiago, Chile, September 1994; Focussed CLARANS, as disclosed by M. Ester et al., A database interface for clustering in large spatial databases, Proc. of the 1st Int'l Conference on Knowledge Discovery in Databases and Data Mining, Montreal, Canada, August 1995; and BIRCH, as disclosed by T. Zhang et al., BIRCH: An efficient data clustering method for very large databases, Proc. of the ACM SIGMOD Conference on Management Data, Montreal, Canada, June 1996.

Hierarchial clustering is a nested sequence of partitions. An agglomerative, hierarchial clustering starts by placing each object in its own atomic cluster and then merges the atomic clusters into larger and larger clusters until all objects are in a single cluster. Divisive, hierarchial clustering reverses the process by starting with all objects in cluster and subdividing into smaller pieces. For theoretical and empirical comparisons of hierarchical clustering techniques, see for example, A. K. Jain et al., Algorithms for Clustering Data, Prentice Hall, 1988, P. Mangiameli et al., Comparison of some neutral network and hierarchical clustering methods, European Journal of Operational Research, 93(2):402–417, September 1996, P. Michaud, Four clustering techniques, FGCS Journal, Special Issue on Data Mining, 1997, and M. Zait et al., A Comparative study of clustering methods, FGCS Journal, Special Issue on Data Mining, 1997.

Emerging data mining applications place special requirements on clustering techniques, such as the ability to handle high dimensionality, assimilation of cluster descriptions by users, description minimization, and scalability and usability. Regarding high dimensionality of data clustering, an object typically has dozens of attributes in which the domains of the attributes are large. Clusters formed in a high-dimensional data space are not likely to be meaningful clusters because the expected average density of points anywhere in the high-dimensional data space is low. The requirement for high dimensionality in a data mining application is conventionally addressed by requiring a user to specify the subspace for cluster analysis. For example, the IBM data mining product, Intelligent Miner described in the IBM Intelligent Miner User's Guide, version 1 release 1, SH12-6213-00 edition, July 1996, and incorporated by reference herein, allows specification of "active" attributes for defining a subspace in which clusters are found. This approach is effective when a user can correctly identify appropriate attributes for clustering.

A variety of approaches for reducing dimensionality of a data space have been developed. Classical statistical techniques include principal component analysis and factor analysis, both of which reduce dimensionality by forming linear combinations of features. For example, see R. O. Duda et al., Pattern Classification and Scene Analysis, John Wiley and Sons, 1973, and K. Fukunaga, Introduction to Statistical Pattern Recognition, Academic Press, 1990. For the principal component analysis technique, also known as Karhunen-Loeve expansion, a lower-dimensional representation is found that accounts for the variance of the attributes, whereas the factor analysis technique finds a representation that accounts for the correlations among the attributes. For an evaluation of different feature selection methods, primarily for image classification, see A. Jain et al., Algorithms for feature selection: An evaluation, Technical report, Department of Computer Science, Michigan State University, East Lansing, Mich., 1996. Unfortunately, dimensionality reductions obtained using these conventional approaches conflict with the requirements placed on the assimilation aspects of data mining.

Data mining applications often require cluster descriptions that can be assimilated and used by users because insight and explanations are the primary purpose for data mining. For example, see U. M. Fayyad et al., Advances in Knowledge Discovery and Data Mining, AAAI/MIT Press, 1996. Clusters having decision surfaces that are axis parallel and, hence, can be described as Disjunctive Normal Form (DNF) expressions, become particularly attractive for user assimilation. Nevertheless, even while a description is a DNF expression, there are clusters that are poorly approximated poorly, such as a cigar-shaped cluster when the cluster description is restricted to be a rectangular box. On the other hand, the same criticism can also be raised against decision-tree and decision-rule classifiers, such as disclosed by S. M. Weiss et al., Computer Systems that Learn: Classification and Prediction Methods from Statistics, Neural Nets, Machine Learning, and Expert Systems, Morgan Kaufman, 1991. However, in practice, the classifiers exhibit competitive accuracies when compared to techniques, such as neural nets, that generate considerably more complex decision surfaces, as disclosed by D. Michie, Machine Learning, Neural and Statistical Classification, Ellis Horwood, 1994.

The merits of description minimization have been eloquently presented by J. Rissanen, Stochastic Complexity in Statistical Inquiry, World Scientific Publ. Co., 1989. The principal assertion, also known as Occam's razor, is that if two different solutions in the same representation describe a particular data, the less complex solution is more accurate. Further, smaller descriptions lend themselves for user comprehension.

Lastly, a clustering technique should be fast and scale with the number of dimensions and the size of a dataset or input data. It should also be insensitive to the order in which data records are presented.

As a basis for better understanding the problem of finding clusters in subspaces, a formal model is presented. Let domain $A=\{a_1, a_2, \ldots, a_m\}$ be a set of literals, and $A=\{A_1, A_2, \ldots, A_m\}$ be a set of bounded domains. An element $a_i \epsilon A$ is called an attribute and its domain is $A_i$. Assume that $(a_1, a_2, \ldots, a_m)$ defines a texicographic ordering on attributes in domain A. For now, only numeric attributes are assumed. An input consists of a set of m-dimensional vectors points) $V=\{v_1, v_2, \ldots, v_n\}$, where $v_i=<v_{i1}, v_{i2}, \ldots, v_{im}>$. The jth component of vector $v_i$ is drawn from domain $A_j$.

An m-dimensional data space $S=A_1 \times A_2 \times \ldots \times A_m$ can be viewed as being partitioned into non-overlapping rectangular units. Each unit has the form $\{r_l, \ldots, r_m\}$, $r_j=<a_j, l_j, u_j>$ such that $l_j \leq u_j$, where $l_j, u_j \in A_j$ and $a_h$ for $j \neq h$. The units have been obtained by some partitioning into intervals (e.g., equi-width, user-specified, etc.) of each of the $A_i$. The partitioning scheme can be different for each $A_i$.

A point $v_i=<v_{i1}, v_{i2}, \ldots, v_{im}>$ is said to be contained in a unit $\{r_1, \ldots, r_m\}$ if $l_j \leq v_{ij} \leq u_j$ for all $r_j$. The density of a unit is defined to be the fraction of total data points contain in the unit. The average density of the data space S is the average of the densities of all the units included in S. A unit is defined to be dense if its density is greater than $\lambda$ fraction of the average density of S, where $\lambda$ is a model parameter.

A cluster is a set of connected dense units. Two units are connected if they have a common face. Formally, two units, $\{r_1, \ldots, r_m\}$ and $\{r'_1, \ldots, r'_m\}$ are said to be connected if there are m−1 dimensions (assume 1, . . . , m−1 without loss of generality) such that $r_j=r'_j$ and either $u_m=l'_m$ or $u'_m=l_m$.

A region R in m dimensions is an axis-parallel rectangular m-dimensional set. That is, $R=\{r_1, \ldots, r_m\}$, $r_j=<a_j, l_j, u_j>$ for $l_j, u_j \epsilon A_j$ such that $l_j \leq u_j$ and $a_j \neq a_h$ for $j \neq h$. A unit is a special case of a region. Only those regions that can be expressed as unions of units are of interest; henceforth all references to a region herein mean such unions. The size of a region is the number of units contained in the region. Supersets and subsets of a region are regions in the same set of dimensions: a region $R'=\{r'_1, \ldots, r'_m\}$ is a superset (respectively, subset) of a region $R=\{r_1, \ldots, r_m\}$ if for each j, $l'_j \leq l_j$ and $u'_j \geq u_j$ ($l'_j \geq l_j$ and $u'_j \leq u_j$, respectively).

A region R is said to be contained in a cluster C if $R \cap C=R$. A region can be expressed as a DNF expression over intervals of the domains $A_i$. A region R contained in a cluster C is said to be maximal if no proper superset of R is contained in C. A minimal description of a cluster is a non-redundant covering of the cluster with maximal regions. That is, a minimal description of a cluster C is a set S of maximal regions of the cluster such that their union equals C, but the union of any proper subset of S does not equal C.

Frequently, there is interest in identifying a cluster in a subset of the m dimensions in which there is at least one dense unit. Further, it is assumed that there is one global value of $\lambda$ for determining dense units. All foregoing definitions carry through after considering appropriate projections from the original data space to the subspace of interest. Note that if a unit is dense in a set of dimensions $a_1, \ldots, a_k$, its projections in all subsets of this set of dimensions are also dense.

The foregoing clustering model can be considered nonparametric in that mathematical forms are neither assumed for data distribution, nor for clustering criteria Instead, data points are separated according to the valleys of a density function, such as disclosed by K. Fukunaga, Introduction to Statistical Pattern Recognition, Academic Press, 1990. One example of a density-based approach to clustering is DBSCAN, as disclosed by M. Ester et al., A density-based algorithm for discovering clusters in large spatial databases with noise, Proc. of the 2nd Int'l Conference on Knowledge Discovery in Databases and Data Mining, Portland, Oregon, August 1995. This approach defines a cluster as a maximal set of density-connected points. However, the application domain for DBSCAN is spatial databases and with interest in finding arbitrarily-shaped clusters.

Several other techniques for nonparametric clustering are based on estimating density gradient for identifying valleys in the density function. These techniques are computationally expensive and generally result in complex cluster boundaries, but which may provide the most correct approach for certain data mining applications.

The problem of covering marked boxes in a grid with rectangles has been addressed in logic minimization by, for example, S. J. Hong, MINI: A heuristic algorithm for two-level logic minimization, Selected Papers on Logic Synthesis for Integrated Circuit Design, R. Newton, editor, IEEE Press, 1987. It is also related to the problem of constructive solid geometry (CSG) formula in solid-modeling, such as disclosed by D. Zhang et al., Csd set-theoretic solid modelling and NC machining of blend surfaces, Proceedings of the Second Annual ACM Symposium on Computational Geometry, pages 314–318, 1986. These techniques have also been applied for inducing decision rules from examples, such as disclosed by S. J. Hong, R-MINI: A heuristic algorithm for generating minimal rules from examples, 3rd Pacific Rim Int'l Conference on AI, August 1994. However, MINI and R-MINI are quadratic in the size of input (number of records). Computational geometry literature also contains algorithms for covering points in two-or three-dimensions with minimum number of rectangles, for example, see D. S. Franzblau et al., An algorithm for constructing regions with rectangles: Independence and minimum generating sets for collections of intervals, Proc. of the 6th Annual Symp. on Theory of Computing, pages 268–276, Washington D.C., April 1984; R. A. Reckhow et al., Covering simple orthogonal polygon with a minimum number of orthogonally convex polygons, Proc. of the ACM 3rd Annual Computational Geometry Conference, pages 268–277, 1987; and V. Soltan et al., Minimum dissection of rectilinear polygon with arbitrary holes into rectangles, Proc. of the ACM 8th Annual Computational Geometry Conference, pages 296–302, Berlin, Germany, June 1992.

Some clustering algorithms used for image analysis also find rectangular dense regions, but they have been designed for low-dimensional datasets. For example, see M. Berger et al., An algorithm for point clustering and grid generation, IEEE Transactions on Systems, Man and Cybernetics, 21(5):1278–86, 1991; P. Schroeter et al., Hierarchical image segmentation by multi-dimensional clustering and orientation-adaptive boundary refinement, Pattern Recognition, 25(5):695–709, May 1995; and S. Wharton, A generalized histogram clustering for multidimensional image data, Pattern Recognition, 16(2):193–199, 1983.

What is needed is an approach for automatically identifying subspaces in which clusters are found in a multi-dimensional data space and that provides description assimilation for a user, description minimization and scales as the size of the data space increases.

SUMMARY OF THE INVENTION

The present invention automatically identifies subspaces in a multi-dimensional data space in which clusters are found and provides description assimilation for a user, description minimization and scales as the size of the data space increases. The present invention finds clusters embedded in subspaces of high-dimensional data without requiring a user to guess subspaces that might have interesting clusters. The cluster descriptions generated by the present invention are DNF expressions having minimal descriptions for ease of user comprehension. The present invention is insensitive to the order of records input The present invention is a basic data mining operation along with other operations, such as associations and sequential-patterns discovery, time-series clustering, and classification.

The advantages of the present invention are provided by a method for finding clusters of units in high-dimensional data having the steps of determining dense units in selected subspaces within a data space of the high-dimensional data, determining each cluster of dense units that are connected to other dense units in the selected subspaces within the data space, determining maximal regions covering each cluster of connected dense units, determining a minimal cover for each cluster of connected dense units, and identifying the minimal cover for each cluster of connected dense units.

Preferably, the step of determining dense units in selected subspaces is based on a bottom-up cluster identification approach and includes the steps of determining candidate one-dimensional dense units within the high-dimensional data, and determining dense units based on a density of each unit This is accomplished by grouping together dense units that each lie in a same subspace, computing a fraction of the data space that is covered by each group of dense units, and reducing a number groups of dense units that cover a predetermined portion of the data space. The step of determining groups of dense units that cover the predetermined portion of the data space includes the step of reducing a number of groups of dense units based on a minimal description length principle. This is achieved by dividing the groups of dense units into a first set and a second set, determining a mean value for each of the first and second set, determining a deviation value from each mean for each selected subspace, forming a code length using the mean value for each set and the deviation value for each selected subspace, and reducing a number of groups of dense units that cover the predetermined portion of the data space based a minimized code length.

The step of determining each cluster of dense units that are connected to other dense units in the selected subspaces within the data space is based on a labyrinth-search schema. Preferably, this is accomplishing by assigning a cluster identification to a selected unit, with the selected unit being a member of a selected set of dense units and the cluster identification being associated with the selected unit, assigning the cluster identification to a left-neighbor unit of the selected unit in a first dimension, recursively assigning the cluster identification to a left-neighbor unit of each left-neighbor unit assigned the cluster identification in the first dimension, assigning the cluster identification to a right-neighbor unit of the selected unit in the first dimension, recursively assigning the cluster identification to a right-neighbor unit of each right-neighbor unit assigned the cluster identification in the first dimension, recursively assigning the cluster identification to all neighbor units of in each dimension of the data space using unit as a starting point, and repeating the steps of recursively assigning another cluster identification to all neighbor units of another selected unit in each dimension of the data space using the another selected unit as another staring point, with the another selected unit being a member of the selected set of dense units and not having an assigned cluster identification.

The step of determining maximal regions covering each cluster of connected dense units includes the steps of growing a maximal region that covers a selected unit, the selected unit being a member of a selected cluster, recursively growing another maximal region that covers another selected unit, with the another selected unit being a member of the selected cluster and not being covered by a maximal region, and forming a set of regions that are a cover of the selected cluster. According to the invention, the step of growing the maximal region can be based on a greedy-growth algorithm or on a sequential-scan algorithm.

The step of determining the minimal cover for each cluster of connected dense units is based on a minimum number of maximal regions required for covering the selected cluster. According to the invention, the step of determining the minimal cover for each cluster of connected dense units is further based on a removal heuristic that removes a maximal region covering a fewest number of units, every unit contained in the smallest maximal region being contained in another maximal region. Alternatively, the step of determining the minimal cover for each cluster of connected dense units is further based on an addition heuristic that forms a maximal region that covers a maximum number of uncovered units in the selected cluster.

The present invention also provides a program storage device having a storage area, and information stored in the storage area. The stored information is readable by a machine, and tangibly embodies a program of instructions executable by the machine for performing method steps for finding clusters of units in high-dimensional data according to the present invention.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
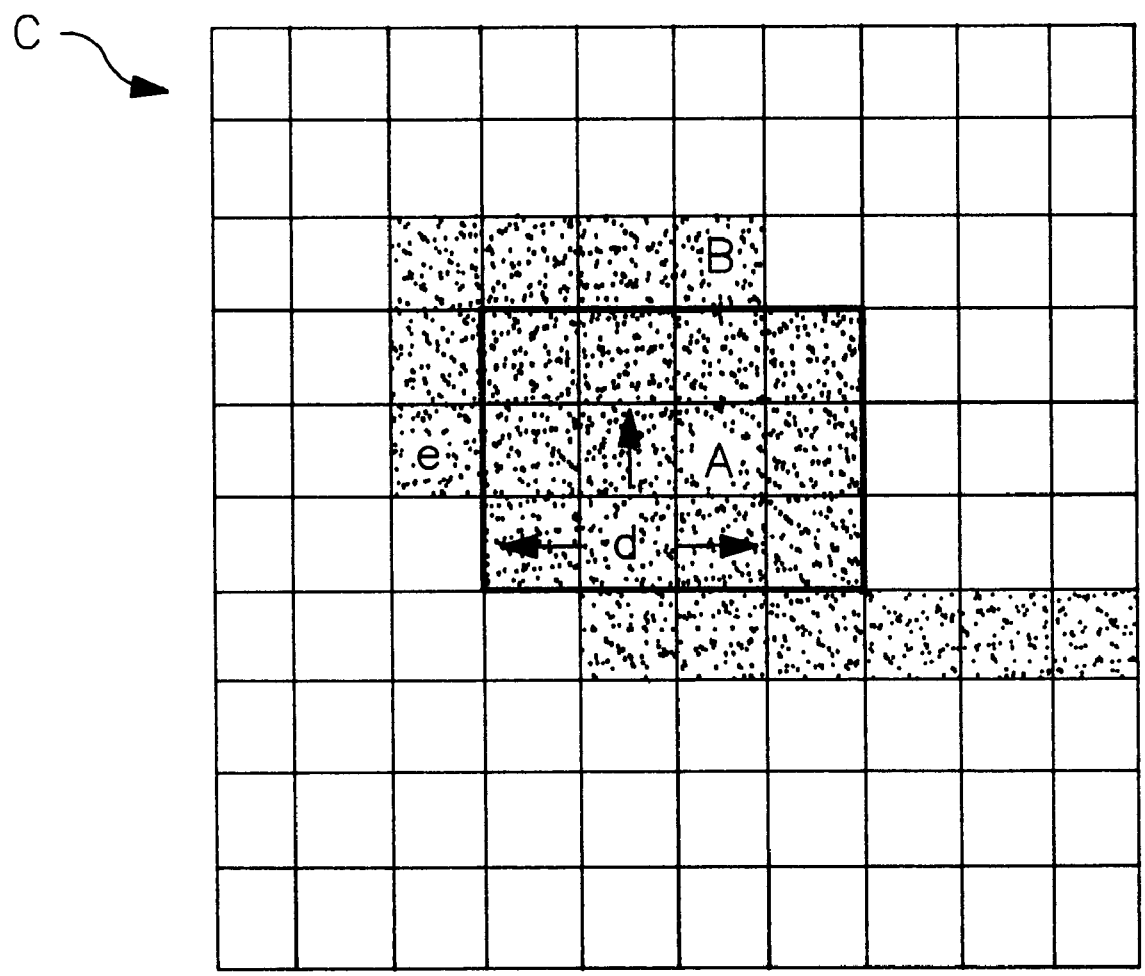
FIG. 1 illustrates an example of a greedy-growth approach for determining maximal regions covering a cluster C according to the present invention.

The present invention provides a clustering technique, herein referred to as CLIQUE (for CLustering In QUEst), that automatically finds subspaces of the highest dimensionality in a data space such that high-density clusters exist in those subspaces. Further, the present invention provides identical results irrespective of the order in which input records are presented. Pruning techniques are used for speeding the search and for producing minimal cluster descriptions.

There are special cases of subspace clustering that are desirable in practice and are easily provided by the present invention. For example, having found clusters in a space, the clusters in its subspace are ignored. Another example is that clusters are found only in those spaces in which the clusters contain at least a τ fraction of total data points. Yet another example is a combination of these two special cases.

The CLIQUE clustering technique of the present invention includes four phases: (1) determination of dense units in all subspaces of interest; (2) determination of connected dense units in all subspaces of interest; (3) determination of maximal regions covering each cluster of connected dense units; and (4) determination of a minimal cover for each cluster of connected dense units.

For the first phase of the present invention, the simplest way for identifying dense units would be to create a histogram in all subspaces and count the points contained in each unit during one pass over the data. However, this approach is infeasible for high dimensional data. Consequently, the present invention uses a bottom-up cluster identification approach that is similar to the conventional Apriori algorithm for finding Association rules, as disclosed by R Agrawal et al., Fast Discovery of Association Rules, Advances in Knowledge Discovery and Data Mining, U. M. Fayyad et al., editors, AAAI/MIT Press, Chapter 12, pages 307–328, 1996, and incorporated by reference herein. A similar bottom-up cluster identification approach for determining modes in high-dimensional histograms is disclosed by R. S. Chhikara et al., Register A numerical classification method for partitioning of a large multidimensional mixed data set, Technometrics, 21:531–537, 1979.

The bottom-up cluster identification approach of the present invention proceeds level-by-level, by first determining one-dimensional dense units by making a pass over the data. Having determined (k−1)-dimensional dense units, candidate k-dimensional dense units are determined using a candidate generation procedure described next. A pass over the data is made to find the k-dimensional units that are actually dense. The bottom-up cluster identification approach terminates when no more candidates are generated.

The candidate generation procedure of the present invention takes as an argument $D_{k-1}$, which is the set of all (k−1) dimensional dense units. A superset of the set of all k-dimensional dense units is returned. For purposes of the present invention, the relationship < represents a lexicographic ordering on attributes in a data space. The following exemplary pseudocode outlines an operation in which $D_{k-1}$ is self-joined using a join condition that units share first K−2 dimensions:

insert into $C_k$ select $d_1 \cdot \langle a_1, l_1, u_1 \rangle, d_1 \cdot \langle a_2, l_2, u_2 \rangle, \ldots,$ $d_1 \cdot \langle a_{k-1}, l_{k-1}, u_{k-1} \rangle, d_2 \cdot \langle a_{k-1}, l_{k-1}, u_{k-1} \rangle,$ from $D_{k-1} \, d_1, D_{k-1} \, d_2$ where $d_1 \cdot a_1 = d_2 \cdot a_2, d_1 \cdot l_1 = d_2 \cdot l_1, d_1 \cdot u_1 = d_2 \cdot u_1,$ $d_1 \cdot a_2 = d_2 \cdot a_2, d_1 \cdot l_2 = d_2 \cdot l_2, d_1 \cdot u_2 = d_2 \cdot u_2, \ldots,$ $d_1 \cdot a_{k-2} = d_2 \cdot a_{k-2}, d_1 \cdot l_{k-2} = d_2 \cdot l_{k-2}, d_1 \cdot u_{k-2} = d_2 \cdot u_{k-2},$ $d_1 \cdot a_{k-1} < d_2 \cdot a_{k-1}$ The dense units are discarded from $C_k$ that have a projection in (k−1) dimensions that is not included in $C_{k-1}$. The correctness argument for this aspect of the present invention is similar to that in R Agrawal et al., supra, and is based on the observation that for any k-dimensional dense unit, its projections in any of k−1 dimensions must also be dense.

Generation of dense units is the only phase of the present invention in which database records are accessed. During generation of $C_k$, dense units $D_{k-1}$ and candidate units $C_k$ are stored. While making a pass over the data, a storage area for $C_k$ and at least one page for buffering the database records are needed Consequently, the approach of the present invention can work with databases of any size. Nevertheless, memory must be managed carefully as the candidates may swamp the available buffer. This is easily handled, though, by generating as many candidates of $C_k$ as will fit in the buffer and scanning the database for determining the density of the candidates. Dense units resulting from the candidates are written to memory, while non-dense candidates are deleted. Candidate generation is repeated until all of $C_k$ has been examined.

The number of database passes performed by the present invention is reduced, based on concepts disclosed by H. Toivonen, Sampling large databases for association rules, Proc. of the 22nd Int'l Conference on Very Large Databases, pages 134–145, Mumbai (Bombay), India, September 1996; and by S. Brin et al., Dynamic itemset counting and implication rules for market basket data, Proc. of the ACM SIGMOD Conference on Management of Data, May 1997, both of which are incorporated by reference herein.

While the approach of the present invention dramatically reduces the number of units that are tested for denseness, high dimensional data may still be a computationally infeasible task. As the dimensionality of the subspaces increases, there is an explosion in the number of dense units, and so the pool of candidate units must be pruned. The pruning procedure of the present invention is applied to dense units that have been computed after the i-th level of the dense unit generation algorithm, for example i=3. The pruned set of dense units is then used for forming candidate units in the next level of the dense unit generation phase. The underlying motivation for pruning is to use only the dense units that lie in interesting spaces.

Pruning, according to the invention, groups together dense units that lie in the same subspace. Then, the fraction of the database that is covered by the dense units each subspace is computed. Subspaces that cover a large fraction of the database, or include units with high density, are considered interesting. The rationale is that if a cluster exists in k dimensions, then for every subspace of the k dimensions, there exists dense units in this subspace that cover at least the points in the cluster, that is, the projections of the dense units that cover the cluster in the original k dimensions.

In other words, the present invention sorts subspaces based on the fraction of the database a subspace covers. To decide which subspaces (and the corresponding dense units) are pruned, the Minimal Description Length (MDL) Principle is applied. For the MDL Principle, the basic idea is to encode the input data under a given model, and select the encoding that minimizes the code length. For a theoretical basis of these ideas, see J. Rissanen, Stochastic Complexity in Statistical Inquiry, World Scientific Publ. Co., 1989.

For the present invention, the sorted list of subspaces are divided into two clusters, a pruned set and a live set. The model used by the present invention is for each set, the mean is kept, and for each subspace, the deviation from the mean is kept. The code length is the sum of the bit lengths of the numbers needed to be stored For example, assume the subspaces $S_1, S_2, \ldots, S_n$, and the sorted list of the covered fractions being respectively $x_{S1}, x_{S2}, \ldots, x_{Sn}$. Then, if dimensions $x_{Si+1}, \ldots, x_{Sn}$ are decided to be pruned, then the length of the encoding is:

$$CL(i) = \log_2((\sum_{1 \le j \le i} \log_2 \left( x_{Sj} - (\sum_{1 \le j \le i} x_{Sj})/i \right) +$$

$$\log_2((\sum_{i+1 \le j \le n} x_{Sj})/(n-i)) + \sum_{i+1 \le j \le} \log_2(s_{Sj} - (\sum_{i+1 \le j \le n} x_{Sj})/(n-i))$$

$$= \log_2((\sum_{1 \le j \le i} x_{Sj})/i) + \log_2((\sum_{i+1 \le j \le n} x_{Sj})/(n-1)) +$$

$$\log_2(\sum_{1 \le j \le i} x_{Sj})/(\log_2((\sum_{1 \le j \le i} x_{Sj})/i) +$$

$$\log_{Sj}(\sum_{i+1 \le j \le n} x_{Sj})/\log_2((\sum_{i+1 \le j \le n} x_{Sj})/(n-1))$$

The optimum pruning cut is one of the n−1 positions along the sorted sequence, so there are only n−1 sets of pruned subspaces to consider. Additionally, the optimum cut can be computed with only two passes of the sorted sequence. Note that CL(1) can be computed in one pass, and CL(i+1) can be computed in constant time if CL(i), $\Sigma_{i+1 \le j \le n} x_{Sj}, \Sigma_{i+1 \le j \le n} x_{Sj}, x_{Si+1}$ and i are known. This allows CL(i), 1<i<n to be computed in one pass and, therefore, optimal partitioning can be found efficiently.

The input to the second phase of the present invention is a set of dense units D that are all in the same k-dimensional space S. The output is a partition of D into $D^1, \ldots, D^h$, such that all units in $D^i$ are connected and no two units $d^i \in D^i$, $d^j \in D^j$ with i≠j are connected. Thus, each partition is a cluster. Intuitively, the approach of the present invention is straight-forward and proceeds according to a labyrinth-search schema by starting with some unit d and D that is assigned to the first cluster number. The left neighbor of d in dimension $a_1$ is then visited and the same cluster number assigned to the left neighbor. This is done for the left neighbor of d and the left neighbor of the left neighbor of d, and so on. Next, the right neighbor of d in dimension $a_1$ is visited and assigned to the same cluster number. Similarly, the right neighbor of d and the right neighbor of the right neighbor of d, and so on, are visited and assigned to the same cluster. The procedure is repeated at d for all dimensions of S. Then, the next unit in D that has not yet been assigned a cluster number is found and the recursive numbering scheme is applied with the next unit as the starting point The following exemplary pseudocode outlines a procedure for a greedy-growth labyrinth-search:

```
input: starting unit d = {<a₁,l₁,u₁>,. . ., <aₖ,lₖ,uₖ>}
       clusternumber n
labyrinth(u,n)
d.num = n
for (j = 1; j < k; j++) do begin
    // examine the left neighbor of d in dimension aⱼ
    d^l = {<a₁,l₁,u₁>,. . ., <aⱼ₋₁,lⱼ₋₁,uⱼ₋₁>, <aⱼ,(lⱼ^l),(uⱼ^l), <aⱼ₊₁,lⱼ₊₁,
          uⱼ₊₁>,. . ., <aₖ,lₖ,uₖ>}
    if (d^l is dense) and (d^l.num is undefined)
        labyrinth(d^l,n)
    // examine the right neighbor of d in dimension aⱼ
    d^r = {<a₁,l₁,u₁>,. . ., <aⱼ₋₁,lⱼ₋₁,uⱼ₋₁>, <aₖ,(lⱼ^r),(uⱼ^r), <aⱼ₊₁,lⱼ₊₁,
          Uⱼ₊₁>,. . ., <aₖ,lₖ,uₖ>}
    if (d^r is dense) and (d^r.num is undefined)
        labyrinth(d^r,n)
end
```

The input to the third phase of the present invention is a set of clusters C. Recall that a cluster C is a set of connected dense units in the same k-dimensional space S. For each cluster C in C, the output will be a set R of maximal regions such that R is a cover of C. A set of regions R is a cover of C if every region in R is contained in C and every dense unit in C is contained in at least one region of R.

To determine the set R of maximal regions, the present invention provides two alternative approaches: a sequential-scan approach and a greedy-growth approach. The sequential-scan approach generates an exhaustive cover consisting of all maximal regions contained in the cluster, while the greedy-growth approach is faster, but may not include some maximal regions contained in the cluster. An advantage of the sequential-scan approach is that since it generates an exhaustive cover, it may lead to smaller descriptions after the fourth phase of the present invention. The greedy-growth approach is first presented, followed by sequential-scan approach.

The greedy-growth approach begins with an arbitrary dense unit $d_1 \in C$ from which a maximal region $r_1$ is greedily grown, as described herein, that covers $d_1$. Region $r_1$ is added to R. Another unit $d_2 \in C$ is found that is not yet covered by the maximal regions in R. A maximal region $r_2$ is greedily grown that covers $d_2$. This approach is continued until all units in C are covered by some maximal region in R To obtain a maximal region covering a dense unit d, unit d is started with and grown along a dimension $a_1$, both to the left and to the right of unit d. Unit d is grown as much as possible in both directions using connected dense units contained in the cluster C. The result is a rectangular region r contained in C. Region r is then grown along a dimension $a_2$, both to the left and to the right of the region using only connected dense units from C, thus obtaining a possibly larger rectangular region that forms the seed for the next iteration. This procedure is repeated for all the dimensions, yielding a maximal region covering d. The order in which dimensions are considered for growing a sense unit can be randomly selected FIG. 1 illustrates an example of a greedy-growth approach for determining maximal regions covering a cluster C according to the present invention. The dense units within cluster C are shown as being shaded. Starting from dense unit d, growth is first performed in the horizontal dimension. In this way, a rectangle A is found that includes four dense units. Then, rectangle A is extended in the vertical direction one step at a time. A maximal rectangle is formed when rectangle A cannot be extended further. For this example, rectangle B is the maximal rectangle. The next step of the greedy-growth approach for the example of FIG. 1 is to find a dense unit that is not covered by rectangle B, for example unit e.

The asymptotic running times of the present invention are described in terms of dense units accesses. Dense units are stored in a data structure, e.g., a hash tree, that allows efficient queries. For each maximal region R, the greedy-growth approach performs O(Size(R)) dense unit accesses, where Size(R) is the number of dense units contained in R. This is shown by letting S be the subspace that R lies in, K the number of dimensions of S, and N the number of dense units in S. The greedy-growth approach accesses each unit that R covers for ascertaining whether R is indeed part of a cluster. Additionally, the greedy-growth approach also accesses each neighbor unit of R for ascertaining whether R is maximal and, consequently, no region that is a proper superset of R is part of a cluster. However, the number of neighbor units is bound by 2kSize(R).

Since every new maximal region covers at least one yet-uncovered dense unit, the greedy-growth approach finds at most O(n) new regions. Every new region requires O(Size(R))=O(n) dense unit accesses, so the greedy-growth algorithm performs $O(n^2)$ dense unit accesses.

The following example shows that this bound is almost tight Let S contain only one cluster having n dense units, and that is bounded by two parallel hyperplanes and a cylinder that is parallel to one dimension. Since the hyperplanes are not parallel to any of the k dimensions, the boundary of the cluster that touches the hyperplanes consists of O(n(k−1)/k) convex vertices, each of which must be covered by a maximal region. The size of each region is also O(n(k−1)/k) because each region has to reach the other hyperplane. In this case, the greedy-growth approach of the present invention must perform O(n2(k−1)/k) dense unit access.

The sequential-scan approach of the present invention that determines maximal regions that cover a cluster computes all maximal regions that cover all the dense units lying in a given subspace. The main idea of the sequential-scan approach is to apply an efficient dynamic programming technique. Let S be a subspace having dimensions $a_1, a_2, \ldots, a_k$. A total ordering of the dense units is imposed, and the units are visited according to that order. For each unit d, all maximal regions are found that have d as their upper right corner. Since every maximal region has a unit in its corner, all maximal regions are enumerated in this way. The list of maximal regions for each unit is computed using local information. In particular, for each unit, K different sets of regions are computed, $M_i(d), 1 \leq i \leq k$. $M_i(d)$ is the set of maximal regions when S is projected to the first i dimensions (a1, . . . , ai), and to units that appear lower than d in these dimensions. Every region in $M_i(d)$ either covers the previous unit $d_{prev}$ on the i-th dimension, or it also belongs to $M_{i-1}(d)$. To compute $M_i(d)$, $M_{i-1}(d)$ and $M_i(d_{prev})$ can be used. Once all $M_i(d)$ are computed, the regions in $M_k(d)$, $\forall d \in S$ are examined for finding which regions are maximal.

Figure 2:
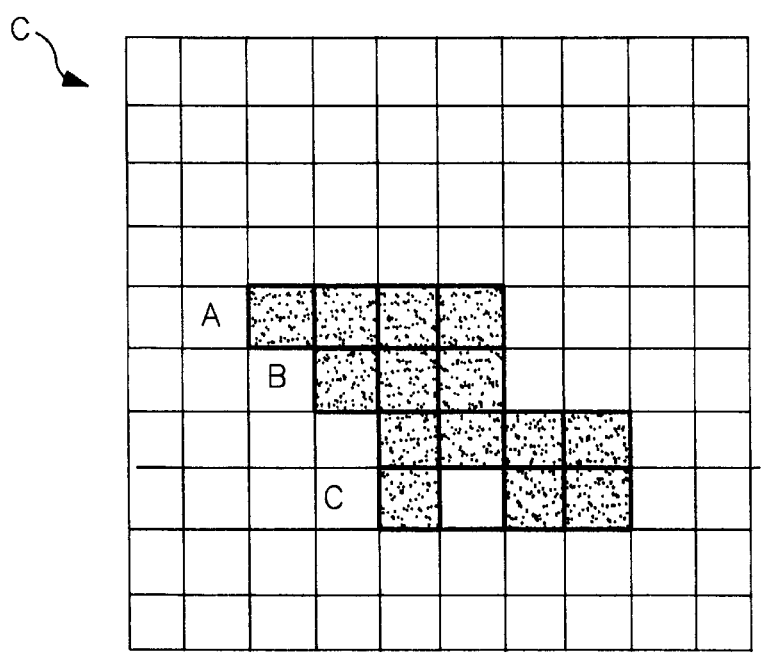
FIG. 2 illustrates an example of the sequential-scan approach for determining maximal regions covering a cluster C in a two-dimensional space according to the present invention.
Figure 3:
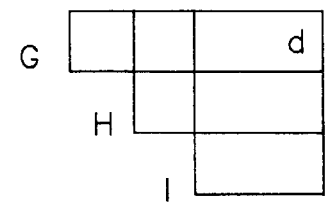
FIG. 3 shows the result of the sequential-scan approach for the example of FIG. 2.

FIG. 2 illustrates an example of the sequential-scan approach for determining maximal regions covering a cluster C in a two-dimensional space according to the present invention. Dense units are shown as being shaded. The units are first ordered on the y-coordinate (vertical) and then on the x-coordinate (horizontal). Since there are two dimensions for the example of FIG. 2, two sets of regions, $M_1(d)$ and $M_2(d)$, are computed for each dense unit d. $M_1(d)$ includes all the regions that exist only in the first (vertical) dimension, and are indicated with a d their top corner. In this case, $M_1(d)=\{F\}$. To compute $M_2(d)$, the dense unit that was visited before d is needed. In this example, dense unit e was visited before d. $M_2(e)$ is already known as $\{A,B,C\}$. The union of each region in $M_2(e)$ is taken with each region in $M_2(d)$. For the union of each pair, the maximal regions are found and inserted in $M_2(d)$. The result, regions $\{G,H,I\}$, is shown in FIG. 3.

More formally, the lexicographical order $<_1$ is defined to be between two units $d \in C$ and $d' \in C$, $d=\{<a_1,l_1,u_1>, \ldots, <a_k,l_k,u_k>\}$, $d'=\{<a_1,l'_1,u'_1>, \ldots, <a_k,l'_k,u'_k>\}$ as:

$$d <_1 d' \iff l_1 = l'_1 \ldots, l_{j-1} = l_{j-1} \wedge l_j < l'_j$$

Given a unit $d=\{<a_1,l_1,u_1>, \ldots, <a_k,l_k,u_k>\}$, the i-cornerset $C_i(d)$ of a set of dense units C is defined to be the set of all $d' \in C$, $d'=\{<a_1,l'_1,u'_1<, \ldots, <a_k,l'_k,u'_l>\}$ such that $u'_1 \leq u_1 \wedge \ldots \wedge u'_i \leq u_i \wedge u'_{i+1} = u_{i+1} \wedge \ldots u'_k = u_k$. Intuitively, $C_i(d)$ consists of all units in C having a projection on an attribute $a \in \{a_1, \ldots, a_i\}$ yielding a unit p that is left to or the same as the projection of unit u on attribute a and having projections on an attribute $a' \in \{a_i+1, \ldots, a_k\}$ that are the same as the projection of unit u on attribute a'.

$M_i(d)$ denotes the subset of all maximal regions that cover $C_i(d)$ such that these regions also cover d. The unit $d=\{<a_1,l_1,u_1>, \ldots, <a_{i-1},l_{i-1},u_{i-1}>, <a_i,l'_i,l_i>, <a_{i+1},l_{i+1},u_{i+1}>, \ldots, <a_k,l_k,u_k>\}$ is an i-lower neighbor of unit $d'=\{<a_1,l_1,u_1>, \ldots, <a_k,l_k,u_k>\}$, short $d=n_i(d')$. Informally, the i-lower neighbor of d is the unit that is directly connected to unit d in dimension $a_i$ and comes in the lexicographical order $<_1$ before unit d.

Exemplary pseudocode for a sequential-scan approach labyrinth-search is set forth below:

```
input: set of dense units contained in cluster C
V = units in C sorted according to order <₁
do
    v=first(V); V = V − v;
    M₀(v) = {v}
    for (i = 1; i ≤ k; i ++
        u = nᵢ(v)
        if (u ∈ C)
            Mᵢ(v) = spatial-extend(Mᵢ(nᵢ(v)),Mᵢ₋₁(v)))
        else
            Mᵢ(v) = Mᵢ₋₁(v)
        endif
    endfor
while (C ≠ ∅)
output: ∪_{u∈C}{r ∈ Mᵢ(u) : mark(r)=false }
```

Exemplary pseudocode for the procedure spatial-extend is set below:

```
input: E = Mᵢ₋₁(v) // extension pieces
       G = Mᵢ(nᵢ(v)) // maximal region candidates
Result = E
for (each pair of regions e ∈ E, g ∈ G)
    let g = {<a₁,l₁,u₁>,. . ., <aᵢ,lᵢ,uᵢ>, <aᵢ₊₁lᵢ₊₁uᵢ₊₁>,. . ., (ak,,lₖ,uₖ>}
    let e = {<a₁,l₁,u₁>,. . ., <aᵢ,lᵢ,uᵢ>, <aᵢ₊₁lᵢ₊₁uᵢ₊₁>,. . ., (ak,,lₖ,uₖ>}
    let j = {<a₁,max(l₁,l'₁),u₁),. . ., <aᵢ₋₁,max(lᵢ₋₁,l'ᵢ₋₁),uᵢ₋₁>, aᵢ, lᵢ,u'ᵢ>,
            <aᵢ₊₁,lᵢ₊₁,uᵢ₊₁>,. . .,
```

-continued

```
(a_k,l_k,u_k)}
    if (j covers g)
        mark(g) = false
    endif
    mark(j) = true;
    Result = Result − {r ∈ Result : j covers r}
    Result = Result ∪ j
endfor
output: Result
```

A time complexity analysis of the sequential-scan approach is similar to that of the greedy-growth approach. It should be kept in mind, though, that when comparing the time complexity analysis of the two approaches, the sequential scan algorithm computes all the maximal regions that are present. The sequential-scan approach also performs O(Size (R)) dense unit accesses per maximal region, so the running time is O(n x (# maximal regions)). The example given also shows that there can be up to $O(n^2)$ maximal regions. That is, every point can be paired on one hyperplane with every point on the other, thus producing a new maximal region for each pair. In the worse case, nevertheless, the sequential-scan approach can be at least a factor of O(n) slower than the greedy-growth approach. For this reason, the greedy-growth is the preferred approach for the present invention.

The last phase of the present invention receives as an input a cover for each cluster and finds a minimal cover for a cluster. Minimality is defined herein in terms of the number of maximal regions required for covering the cluster. The general problem of finding the smallest set cover is NP-hard In fact, it is believed unlikely that the minimum set cover can be approximated to a factor better than ln(n), where n is the size of the universe being covered based on U. Feige, A threshold of ln n for approximating set cover, Proceedings of the Twenty-Eighth annual ACM Symposium on Theory of Computing, pages 314–318, 1996, and by C. Lund et al., On the hardness of approximating minimization problems, Proceedings of the ACM Symposium on Theory of Computing, pages 286–293, 1993, both of which are incorporated by reference herein. For this reason, the present invention provides two suitable heuristics for finding a minimal cover for a cluster, a Removal Heuristic and an Addition Heuristic.

For the Removal Heuristic, the smallest (in number of units) maximal region which is redundant is removed from a cover, i.e., every unit is also contained in some other maximal region. Ties are broken arbitrarily and the procedure is repeated until no maximal region can be removed. For the Addition Heuristic, the cluster is viewed as empty space. The maximal region is added to the cover that will cover the maximum number of yet uncovered units in the cluster. Ties are broken arbitrarily and the procedure is repeated until the whole cluster is covered.

For a general set cover, the Addition Heuristic provides a cover within a factor in n of the optimum, as disclosed by L. Lovász, On the ratio of the optimal integral and fractional covers, Discrete Mathematics, 13:383–390, 1975. Consequently, the Addition Heuristic would appear to be the preferred heuristic of the two heuristics because its quality of approximation matches the negative results of U. Feige, supra, and C. Lund et al., supra. However, implementation of an Addition Heuristic in a high-dimensional geometric setting requires a complex computation of the number of uncovered units that a candidate maximal region will cover. The residual uncovered regions that arise as the cover is formed can be complicated. Indeed, this is of interest in its own right to the approximation algorithms community, where the conventional wisdom holds that the Addition Heuristic is the preferred heuristic for set cover.

The Removal Heuristic, on the other hand, is easy to implement and efficient in execution. It needs a simple scan of the sorted list of regions requiring exactly Size(R) dense unit accesses for each region. The total number of accesses is then $\Sigma Size(R_i)=O(n^2)$. A disadvantage of the Removal Heuristic comes from the worse-case results for the set-cover problem.

Figure 4:
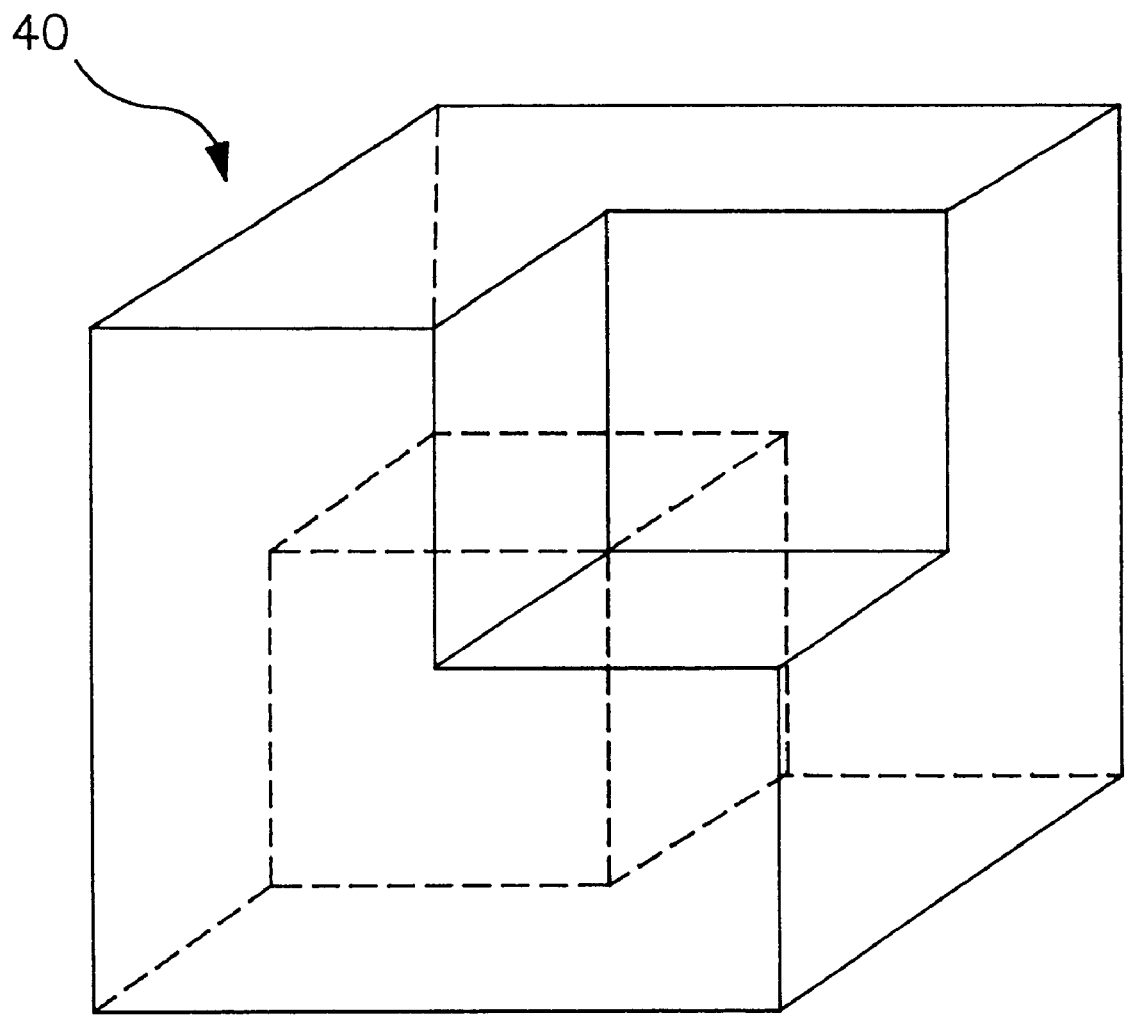
FIG. 4 graphically shows a cluster having two opposite corner sub-cubes removed for illustrating a Removal Heuristic for determining maximal regions covering a cluster.

Nevertheless, the approach of the present invention is not a general set cover problem. Instead, the present invention seeks to cover a union of connected regions with maximal regions and the Removal Heuristic does not find the minimum cover. That is, consider a cluster 40 shown in FIG. 4 that is formed by a 2×2×2 cube in which two opposite corner sub-cubes have been removed. Cluster 40 can be covered by 3 maximal regions (2 solutions), but the Removal Heuristic may use 4 regions if, for example, the two vertical 1×1×2 size maximal regions are removed first. By extending this construction, it can be shown that in d dimensions, the Removal Heuristic may construct a cover that is bigger than the minimum by a factor of d−1. The Removal Heuristic may have the same worst case behavior as the general set cover problem, but the worst-case results for the Removal Heuristic are unlikely to apply in practice.

The present invention was applied to several synthetic and real datasets. The motivations for applying the present invention to the synthetic datasets were for (1) validating the approach of the present invention by testing whether the present invention recovered known clusters in some subspaces of a high dimensional data space; and (2) determining how the running time of the present invention scales with (a) dimensionality of the data space, (b) dimensionality of clusters, and (c) size of the database. All applications of the present invention to the datasets were run on a 133-MHz IBM RS/6000 Model 43P workstation. The data resided in an AIX file system and was stored on a 2GB SCSI 3.5" drive with sequential throughput of about 2 MB/second.

A modified version of the synthetic data generation program used by M. Zait et al., A Comparative study of clustering methods, FGCS Journal Special Issue on Data Mining, 1997, and incorporated by reference herein, was used for a comparative study of conventional clustering algorithms. The data generation program produced datasets having clusters of high density in specific subspaces and provided parameters for controlling the structure and the size of datasets, such as the number of records, the number of attributes, and the range of values for each attribute. A bounded data space (n-dimensional cube) that data points live in was assumed. Each data space was partitioned into a multi-dimensional grid generated by an equi-width partitioning of each dimension into 10 partitions. Each box of the grid formed a unit.

The clusters of the datasets were hyper-rectangles in a subset of dimensions such that the average density of points inside each hyper-rectangle was much greater than the average density i the subspace. The faces of such a hyper-rectangular cluster were parallel to the axis. Consequently, another way to describe the cluster is as the intersection of a set of attribute ranges.

The hyper-rectangle descriptions were user provided, thus forming the subspace that each hyper-rectangle lay in and the range for each attribute in the subspace. A number of data points (records) were assigned to each cluster. The cluster points were randomly and uniformly placed inside the ranges defining the hyper-rectangle. In the remaining dimensions, the cluster points were uniformly distributed in the data space. After distributing a specified number of points equally among the specified clusters in this way, an additional 10% of points were added as random noise. The scalability and accuracy results observed for the synthetic data are presented first.

Figure 5:
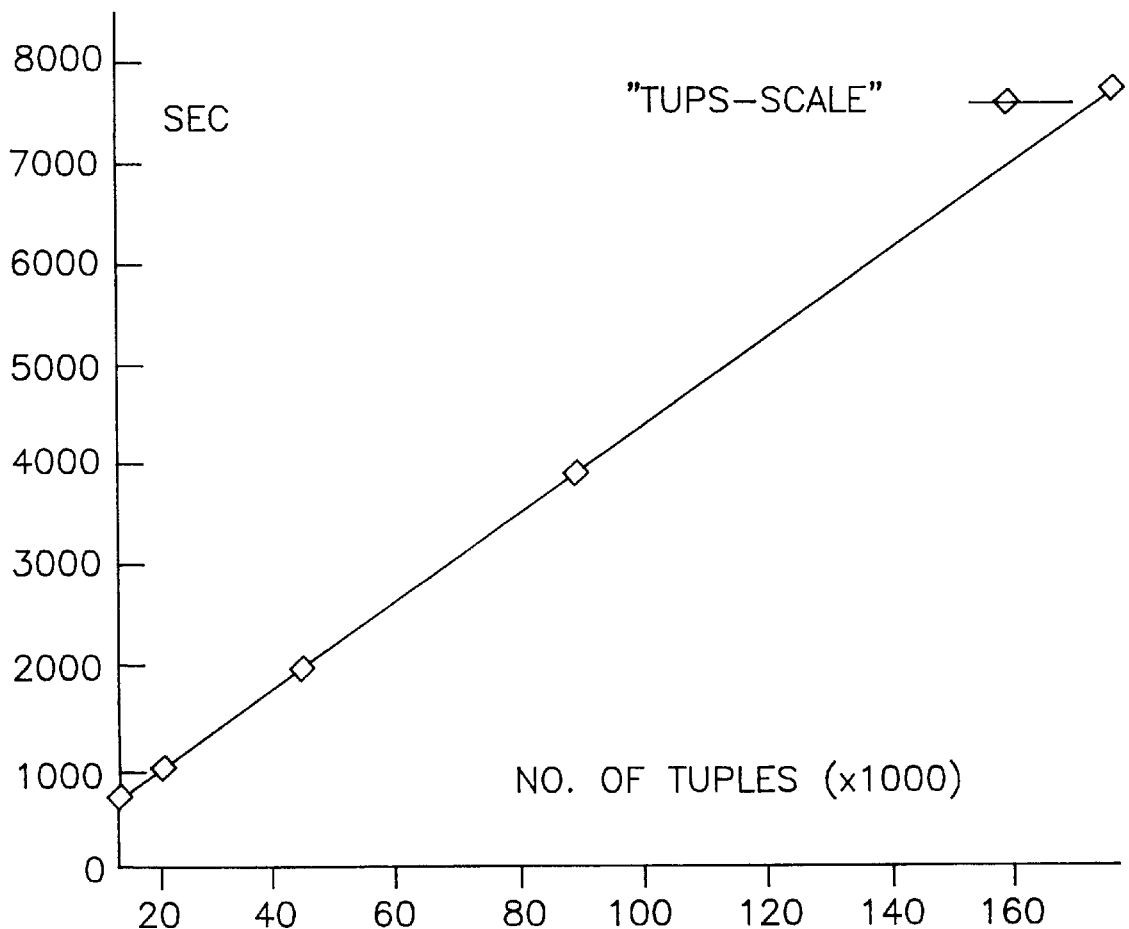
FIG. 5 is a graph showing the results of running time with respect to scalability of the present invention as the size of a database was increased.

FIG. 5 is a graph showing the results of running time with respect to scalability of the present invention as the size of the database was increased from 11,000 to 176,000 records (with 10% noise added in each case.) The data space had 50 dimensions and there were 5 clusters in different subspaces of 5 dimensions. The number of records, or tuples, are shown along the abscissa of FIG. 5. Time measured in seconds is shown along the ordinate of FIG. 5. As is shown in FIG. 5, the running time of the present invention scales linearly with the size of the database.

Figure 6:
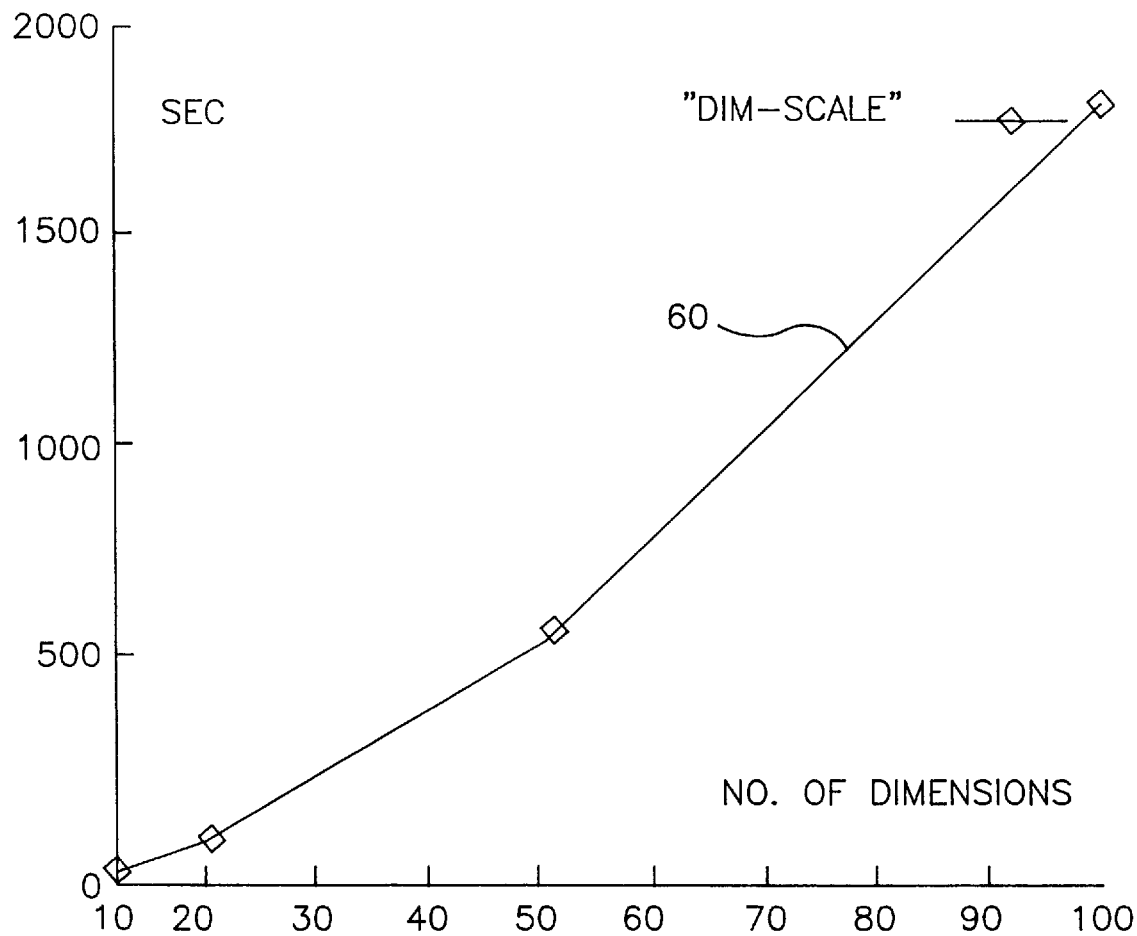
FIG. 6 is a graph showing the results of running time with respect to scalability of the present invention as the dimensionality of a data space was increased.

FIG. 6 is a graph showing the results of running time with respect to scalability of the present invention as the dimensionality of the data space, that is, the number of attributes, was increased from 10 to 100. The database had 11,000 records (with 10% noise points) and there where 5 clusters in different subspaces of 5 dimensions. The number of dimensions are shown along the abscissa of FIG. 6. Time measured in seconds is shown along the ordinate of FIG. 6. Curve 60 exhibits quadratic-type behavior as the number of dimensions increased and shows that the problem of searching for interesting subspaces inherently does not scale well as the dimensionality of the data space increases. In the present example, the present invention searched for clusters in 5 dimensions. The number of 5-dimensional subspaces of a m-dimensional space is $\binom{m}{5}=O(m^5)$. The present invention achieved a better performance because many of the dimensions were pruned during the dense unit generation phase.

Figure 7:
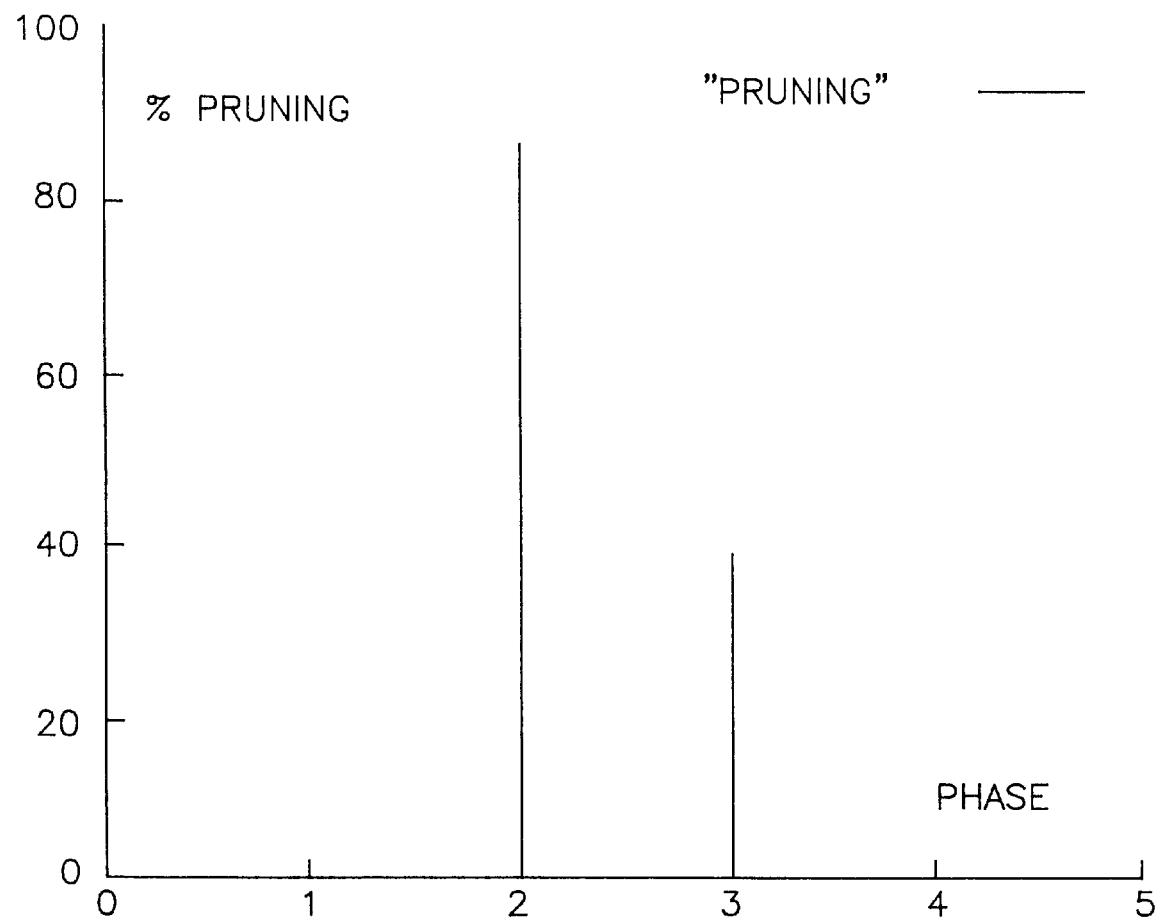
FIG. 7 is a graph showing the percentage of dense units pruned during a run of the present invention for an exemplary synthetic dataset.

FIG. 7 is a graph showing the percentage of dense units pruned during a run of the present invention for a synthetic dataset having 50 dimensions and hidden 5 clusters in 5 dimensions. The abscissa of FIG. 7 represents n-dimensional subspaces, while the ordinate represents the percentage of dense units pruned. For this example, 86% of the density units were pruned for 2-dimensional spaces and 38% of the dense units in 3-dimensional subspaces were pruned.

Figure 8:
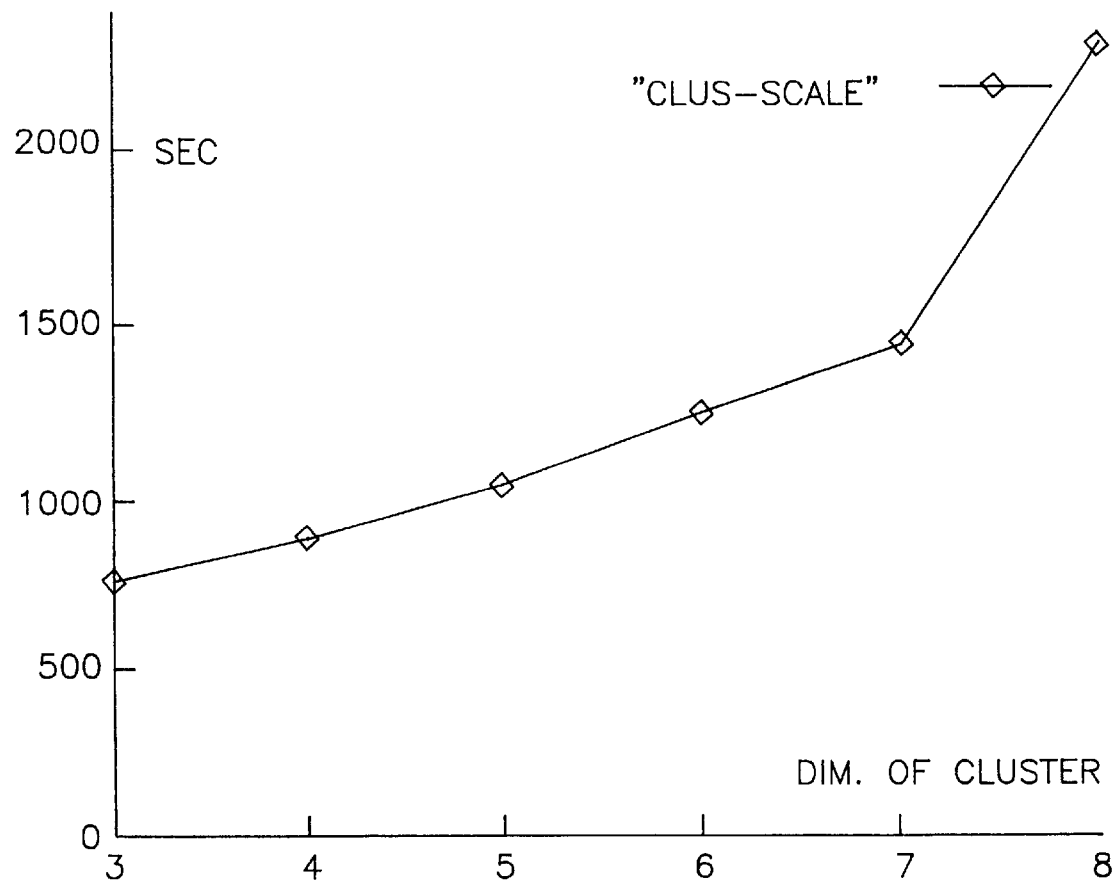
FIG. 8 is a graph showing the results of running time with respect to scalability of the present invention as the highest dimensionality of the hidden clusters was increased.

FIG. 8 is a graph showing the results of running time with respect to scalability of the present invention as the highest dimensionality of the hidden clusters was increased from 3 to 8. The dimension of the hidden clusters is shown along the abscissa of FIG. 8 and the running time of the present invention in seconds is shown along the ordinate. When there were k clusters, the clusters were embedded in k different subspaces of k dimensions each. The database for FIG. 8 had 22,000 records (with 10% noise points) and the data space had 50 dimensions. When a cluster existed in k dimensions, all of its projections in a subset of the k dimensions, that is, $\Sigma_{1 \leq i < k} \binom{k}{i}$ different combinations, are also clusters. In a bottom-up cluster identification approach, all of dimensions were considered if the cluster was to be found in k dimensions. Despite this, the present invention performed extremely well for clusters in lower dimensions.

For all the example datasets, the original clusters were recovered by the present invention. In some cases, additional clusters were reported that typically included a single dense unit having a low density. The additionally reported clusters were by-products of the data generation algorithm. The density threshold for the present invention was set low, typically between 1 and 0.1%. As a result, some units had enough noise points to become dense.

The present invention was applied to two real datasets from insurance companies (Insur1.data, Insur2.data), one dataset from a department store (Store.data), and one dataset from a bank (Bank.data) were used. Characteristics of each of the real datasets are summarized in Table 1.

TABLE 1

| Dataset | No. of records | No. of attributes |
|---|---|---|
| Insur1.data | 13743 | 9 |
| Store.data | 5221 | 24 |
| Insur2.data | 3000 | 7 |
| Bank.data | 10000 | 52 |

For each dataset, the present invention was run with three different density levels. For each density level run, the highest dimension that a large cluster was found, the number of different clusters found in subspaces of the highest dimension, the complexity of the cluster representation (that is, how many maximal regions were reported), and the running time are set forth in Tables 2–5.

For the Insur1.data dataset, two clusters were found that covered over 60% of the dataset. As the density threshold was reduced, the clusters became more complicated, and more regions were required for a covering. Results for the Insur1.data dataset are set forth in Table 2.

TABLE 2

| Insur1.data 9 attributes | | | | |
|---|---|---|---|---|
| Density (%) | highest dimensionality of a cluster | no. of clusters | no. of regions (total) | running time (sec) |
| 1 | 7 | 2 | 5 + 3 | 51 |
| 0.5 | 7 | 2 | 7 + 7 | 59 |
| 0.25 | 7 | 2 | 8 + 12 | 64 |

The Store.data dataset contained one large cluster that covered over 70% of the database in 10 dimensions. Additionally, a number of small clusters appeared in the same subspace. As the density threshold was reduced, the number of small clusters increased because the number of units having the required density increased Results for the Store.data dataset are set forth in Table 3.

TABLE 3

| Store.data 24 attributes | | | | |
|---|---|---|---|---|
| Density (%) | highest dimensionality of a cluster | no. of clusters | no. of regions (total) | running time (sec) |
| 1 | 10 | 4 | 4 + 1 + 1 + 1 | 293 |
| 0.5 | 10 | 6 | 4 + 2 + 3 + 1 + 1 | 360 |
| 0.25 | 10 | 6 | 3 + 3 + 3 + 1 + 1 + 1 | 415 |

For the Insur2.data data set, the interesting observation was that there were clusters in 7 dimensions. However, the clusters only become apparent when the density threshold was reduced. When the threshold was reduced, the present invention located some units that were dense, in accordance with the reduced threshold, but were unconnected to the larger clusters. Another observation was that for a density equal to 0.5%, the 15 clusters found in different subspaces of 6 dimensions. There was no optimal 6-dimensional subspace. The results for the Insur2.data dataset are set forth in Table 4.

TABLE 4

Insur2.data 7 attributes

| Density (%) | highest dimensionality of a cluster | no. of clusters | no. of regions (total) | running time (sec) |
|---|---|---|---|---|
| 1 | 6 | 3 | 1 + 3 + 2 | 3.2 |
| 0.5 | 6 | 15 | 29 | 4.8 |
| 0.25 | 7 | 5 | 2 + 1 + 1 + 1 | 6.2 |

For the Bank.data dataset, there was one cluster in 9 dimensions that covered over 90% of the database. With a reduced density threshold, the present invention also picked up a number of smaller clusters. The running times are higher for this dataset because both the number of the attributes and the cluster dimensionality of the subspace was large. The results of the Bank data dataset are set forth in Table 5.

TABLE 5

Bank.data 24 attributes

| Density (%) | highest dimensionality of a cluster | no. of clusters | no. of regions (total) | running time (sec) |
|---|---|---|---|---|
| 1 | 9 | 1 | 1 | 852 |
| 0.5 | 9 | 2 | 3 + 1 | 1022 |
| 0.25 | 9 | 3 | 3 + 1 + 1 | 1202 |

Figure 9:
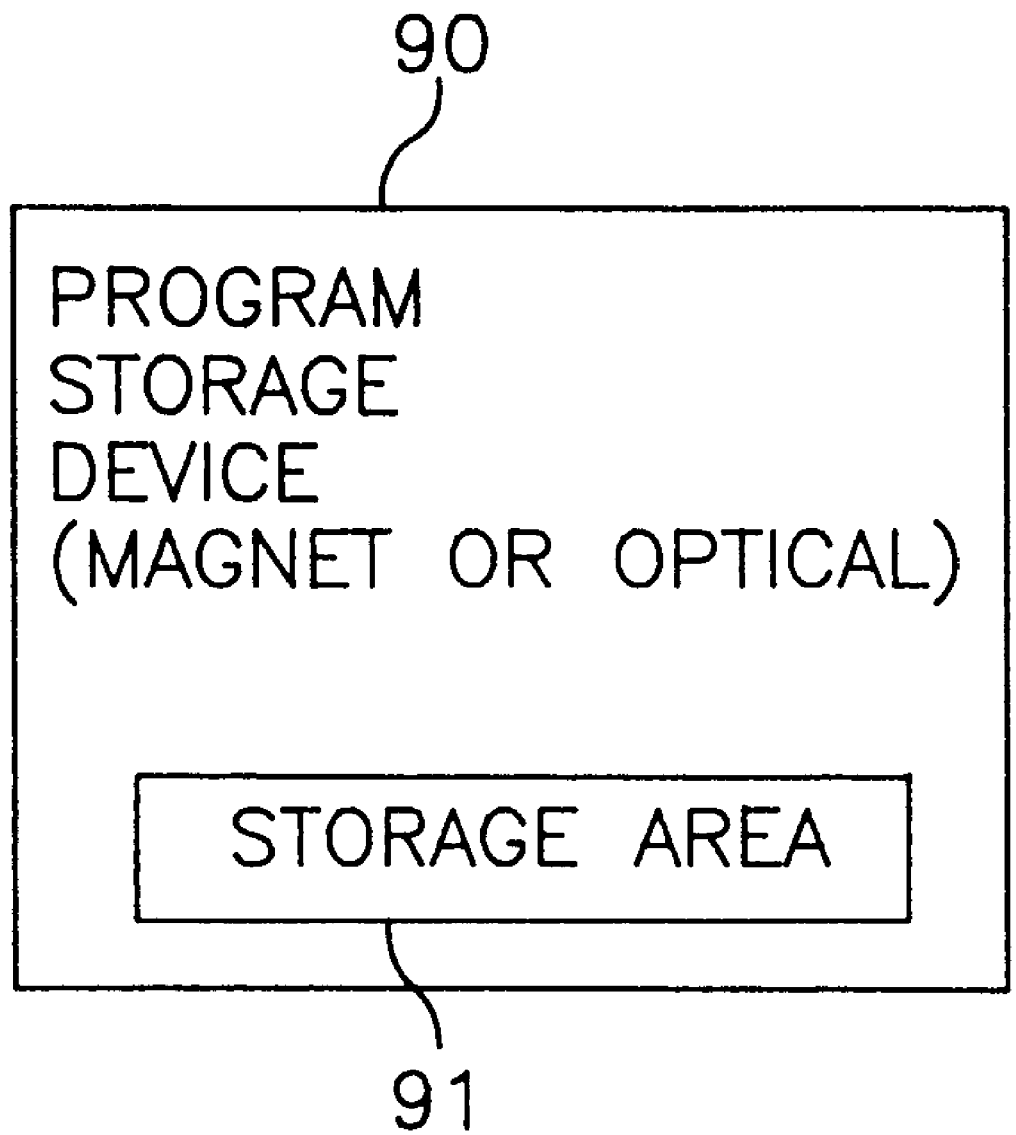
FIG. 9 shows a program storage device having a storage area for storing a program of instructions executable by a machine for performing the method of the present invention.

FIG. 9 shows a program storage device 90 having a storage area 91. Information stored in the storage area in a well-known manner that is readable by a machine, and that tangibly embodies a program of instructions executable by the machine for performing the method of the present invention described herein for automatically finding subspaces of the highest dimensionality in a data space for data mining applications. Program storage device 90 can be a magnetically recordable medium device, such as a magnetic diskette or hard drive, or an optically recordable medium device, such as an optical disk.

Although the present invention is primarily focused on data mining applications, the techniques of present invention are also applicable to OLAP databases. To index OLAP data, for instance, a data space is first partitioned into dense and sparse regions, as disclosed by U.S. Pat. No. 5,359,724 to R. J. Earle. Data in dense regions is stored in an array, whereas a tree structure is used for storing sparse regions. Currently, users are required to specify dense and sparse dimensions. Similarly, the precomputation techniques for range queries over OLAP data cubes require identification of dense regions in sparse data cubes. The present invention can be used for identification of dense regions in sparse data cubes.

While the present invention has been described in connection with the illustrated embodiments, it will be appreciated and understood that modifications may be made without departing from the true spirit and scope of the invention.

What is claimed is:

1. A method for finding clusters of units in high-dimensional data in a database, the method comprising the steps of:

determining dense units in selected subspaces within a data space of high-dimensional data in a database;

determining each cluster of dense units that are connected to other dense units in the selected subspaces within the data space;

determining maximal regions covering each cluster of connected dense units; and determining a minimal cover for each cluster of connected dense units.

2. The method according to claim 1, further comprising the step of identifying the minimal cover for each cluster of connected dense units.

3. The method according to claim 1, wherein the step of determining dense units in selected subspaces is based on a bottom-up cluster identification approach.

4. The method according to claim 1, wherein the step of determining dense units in selected subspaces includes the steps of:

determining candidate one-dimensional dense units within the high-dimensional data; and determining dense units based on a density of each unit.

5. The method according to claim 4, further comprising the steps of:

grouping together dense units that each lie in a same subspace;

computing a fraction of the data space that is covered by each group of dense units; and reducing a number groups of dense units that cover a predetermined portion of the data space.

6. The method according to claim 5, wherein the step of determining groups of dense units that cover the predetermined portion of the data space includes the step of reducing a number of groups of dense units based on a minimal description length principle.

7. The method according to claim 5, wherein the step of determining groups of dense units that cover the predetermined portion of the data space includes the steps of:

dividing the groups of dense units into a first set and a second set;

determining a mean value for each of the first and second set;

determining a deviation value from each mean for each selected subspace;

forming a code length using the mean value for each set and the deviation value for each selected subspace; and reducing a number of groups of dense units that cover the predetermined portion of the data space based a minimized code length.

8. The method according to claim 5, wherein the step of determining each cluster of dense units that are connected to other dense units in the selected subspaces within the data space is based on a labyrinth-search schema.

9. The method according to claim 5, wherein the step of determining each cluster of dense units that are connected to other dense units in the selected subspaces within the data space includes the steps of:

assigning a cluster identification to a selected unit, the selected unit being a member of a selected set of dense units, the cluster identification being associated with the selected unit;

assigning the cluster identification to a left-neighbor unit of the selected unit in a first dimension;

recursively assigning the cluster identification to a left-neighbor unit of each left-neighbor unit assigned the cluster identification in the first dimension;

assigning the cluster identification to a right-neighbor unit of the selected unit in the first dimension;

recursively assigning the cluster identification to a right-neighbor unit of each right-neighbor unit assigned the cluster identification in the first dimension;

recursively assigning the cluster identification to all neighbor units of in each dimension of the data space using unit as a starting point; and repeating the steps of recursively assigning another cluster identification to all neighbor units of another selected unit in each dimension of the data space using the another selected unit as another starting point, the another selected unit being a member of the selected set of dense units and not having an assigned cluster identification.

10. The method according to claim 5, wherein the step of determining maximal regions covering each cluster of connected dense units includes the steps of:

growing a maximal region that covers a selected unit, the selected unit being a member of a selected cluster;

recursively growing another maximal region that covers another selected unit, the another selected unit being a member of the selected cluster and not being covered by a maximal region; and forming a set of regions that are a cover of the selected cluster.

11. The method according to claim 10, wherein each step of growing the maximal region is based on a greedy-growth algorithm.

12. The method according to claim 10, wherein each step of growing the maximal region is based on a sequential-scan algorithm.

13. The method according to claim 10, wherein the step of determining the minimal cover for each cluster of connected dense units is based on a minimum number of maximal regions required to cover the selected cluster.

14. The method according to claim 13, wherein the step of determining the minimal cover for each cluster of connected dense units is further based on a removal heuristic that removes a maximal region covering a fewest number of units, every unit contained in the smallest maximal region being contained in another maximal region.

15. The method according to claim 13, wherein the step of determining the minimal cover for each cluster of connected dense units is further based on an addition heuristic that forms a maximal region that covers a maximum number of uncovered units in the selected cluster.

16. A program storage device comprising:

a storage area; and information stored in the storage area, the information being readable by a machine, and tangibly embodying a program of instructions executable by the machine for performing method steps for finding clusters of units in high-dimensional data of a database, the method steps comprising:

determining dense units in selected subspaces within a data space of the high-dimensional data of the database;

determining each cluster of dense units that are connected to other dense units in the selected subspaces within the data space;

determining maximal regions covering each cluster of connected dense units; and determining a minimal cover for each cluster of connected dense units.

17. The program storage device according to claim 16, wherein the method steps further comprise the step of identifying the minimal cover for each cluster of connected dense units.

18. The program storage device according to claim 16, wherein the step of determining dense units in selected subspaces is based on a bottom-up cluster identification approach.

19. The program storage device according to claim 16, wherein the step of determining dense units in selected subspaces includes the steps of:

determining candidate one-dimensional dense units within the high-dimensional data; and determining dense units based on a density of each unit.

20. The program storage device according to claim 19, wherein the method steps further comprise the steps of:

grouping together dense units that each lie in a same subspace;

computing a fraction of the data space that is covered by each group of dense units; and reducing a number groups of dense units that cover a predetermined portion of the data space.

21. The program storage device according to claim 20, wherein the step of determining groups of dense units that cover the predetermined portion of the data space includes the step of reducing a number of groups of dense units based on a minimal description length principle.

22. The program storage according to claim 20, wherein the step of determining groups of dense units that cover the predetermined portion of the data space includes the steps of:

dividing the groups of dense units into a first set and a second set;

determining a mean value for each of the first and second set;

determining a deviation value from each mean for each selected subspace;

forming a code length using the mean value for each set and the deviation value for each selected subspace; and reducing a number of groups of dense units that cover the predetermined portion of the data space based a minimized code length.

23. The program storage device according to claim 20, wherein the step of determining each cluster of dense units that are connected to other dense units in the selected subspaces within the data space is based on a labyrinth-search schema.

24. The program storage device according to claim 20, wherein the step of determining each cluster of dense units that are connected to other dense units in the selected subspaces within the data space includes the steps of:

assigning a cluster identification to a selected unit, the selected unit being a member of a selected set of dense units, the cluster identification being associated with the selected unit;

assigning the cluster identification to a left-neighbor unit of the selected unit in a first dimension;

recursively assigning the cluster identification to a left-neighbor unit of each left-neighbor unit assigned the cluster identification in the first dimension;

assigning the cluster identification to a right-neighbor unit of the selected unit in the first dimension;

recursively assigning the cluster identification to a right-neighbor unit of each right-neighbor unit assigned the cluster identification in the first dimension;

recursively assigning the cluster identification to all neighbor units of in each dimension of the data space using unit as a starting point; and repeating the steps of recursively assigning another cluster identification to all neighbor units of another selected unit in each dimension of the data space using the another selected unit as another starting point, the another selected unit being a member of the selected set of dense units and not having an assigned cluster identification.

25. The program storage device according to claim 20, wherein the step of determining maximal regions covering each cluster of connected dense units includes the steps of:

growing a maximal region that covers a selected unit, the selected unit being a member of a selected cluster;

recursively growing another maximal region that covers another selected unit, the another selected unit being a member of the selected cluster and not being covered by a maximal region; and forming a set of regions that are a cover of the selected cluster.

26. The program storage device according to claim 25, wherein each step of growing the maximal region is based on a greedy-growth algorithm.

27. The program storage device according to claim 25, wherein each step of growing the maximal region is based on a sequential-scan algorithm.

28. The program storage device according to claim 25, wherein the step of determining the minimal cover for each cluster of connected dense units is based on a minimum number of maximal regions required to cover the selected cluster.

29. The program storage device according to claim 23, wherein the step of determining the minimal cover for each cluster of connected dense units is further based on a removal heuristic that removes a maximal region covering a fewest number of units, every unit contained in the smallest maximal region being contained in another maximal region.

30. The program storage device according to claim 28, wherein the step of determining the minimal cover for each cluster of connected dense units is further based on an addition heuristic that forms a maximal region that covers a maximum number of uncovered units in the selected cluster.

31. The program storage device according to claim 16, wherein the program storage device includes a magnetically recordable medium.

32. The program storage device according to claim 16, wherein the program storage device includes an optically recordable medium.

* * * * *